(No Model.)

E. H. ASHCROFT.
TRACTION WHEEL.

No. 381,202. Patented Apr. 17, 1888.

WITNESSES:
J. M. Dolan.
E. F. Small

INVENTOR
Edward H. Ashcroft
by his atty
Clarke H. Raymond

UNITED STATES PATENT OFFICE.

EDWARD H. ASHCROFT, OF LYNN, MASSACHUSETTS.

TRACTION-WHEEL.

SPECIFICATION forming part of Letters Patent No. 381,202, dated April 17, 1888.

Application filed November 15, 1887. Serial No. 255,187. (No model.)

*To all whom it may concern:*

Be it known that I, EDWARD H. ASHCROFT, of Lynn, in the county of Essex and State of Massachusetts, a citizen of the United States, have invented a new and useful Improvement in Traction-Wheels, of which the following is a full, clear, and exact description, reference being had to the accompanying drawings, forming a part of this specification, in explaining its nature.

My invention relates to traction or driving wheels for locomotives and cars adapted to run upon rails, having arranged in their treads or peripheries a number of shallow recesses or cavities of any desired shape and arrangement. These may be formed in the treads of wheels of ordinary cylindrical shape or wheels having a required plane surface or facet upon their peripheries.

Figure 1:
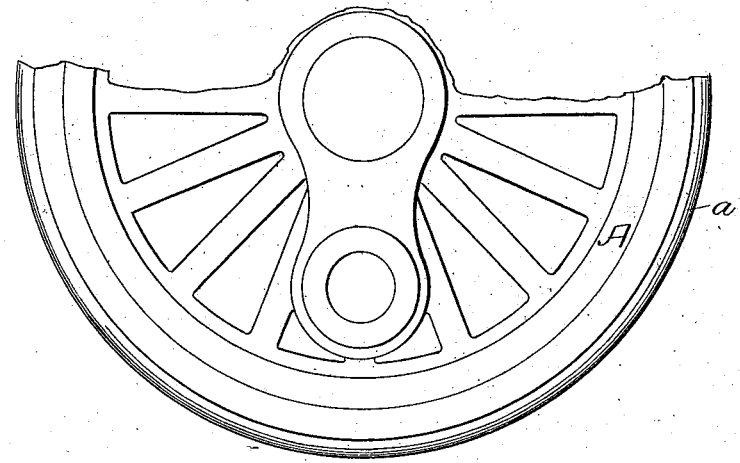
Figure 2:
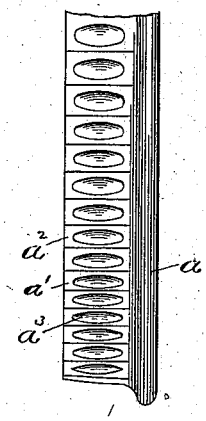
Figure 3:
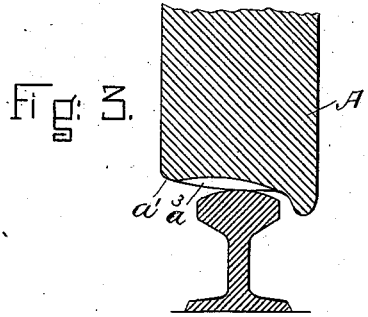
Figure 4:
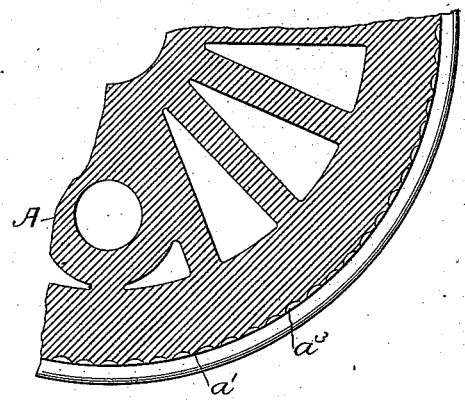
Figure 6:
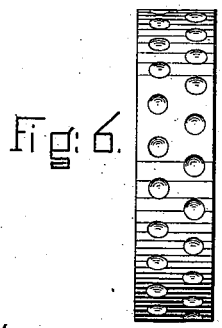
Figure 5:
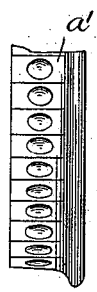
Figure 7:
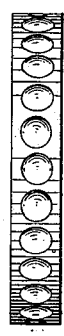

In the drawings, Figure 1 represents a portion of a driving-wheel of a locomotive having the features of my invention. Fig. 2 is a view in end elevation thereof. Fig. 3 is a detail view in section, enlarged, of a portion of a wheel, and also of its rail. Fig. 4 is also a detail view in vertical section. Fig. 5 is a detail view in elevation.

Referring to the drawings, A represents the wheel, $a$ its tire, and $a'$ the tread or periphery of the wheel and tire. The tread of the wheel is formed or provided with shallow recesses or cavities $a^3$. These recesses may extend from a tread which is cylindrical in shape or a tread which is polygonal in shape. The recesses may be oval in shape, as represented in Figs. 2 and 4, circular in shape, as represented in Fig. 5, and they may be arranged a number of them upon the same line, or upon a skew-line, as represented in the drawings.

By providing the treads of the traction or driving wheels with cavities the traction or holding power of the wheels and rail will be very considerably increased.

Having thus fully described my invention, I claim and desire to secure by Letters Patent of the United States—

The locomotive or car driving or traction wheels having shallow recesses or cavities formed in their treads or peripheries, as and for the purposes specified.

EDWARD H. ASHCROFT.

Witnesses:
F. F. RAYMOND, 2d,
J. M. DOLAN.